United States Patent [19]
Takamatsu

[11] 3,959,430
[45] May 25, 1976

[54] METHOD OF PRODUCING INTERLOCKING ELEMENTS FOR SLIDE FASTENERS

[75] Inventor: Ikuo Takamatsu, Uozu, Japan

[73] Assignee: Yoshida Kogyo Kabushiki Kaisha, Japan

[22] Filed: Nov. 7, 1974

[21] Appl. No.: 521,864

[30] Foreign Application Priority Data
Nov. 16, 1973 Japan.............................. 48-129574

[52] U.S. Cl.................................. 264/157; 264/23; 264/145; 264/163; 264/285
[51] Int. Cl.² ........................................ B29D 5/00
[58] Field of Search ............. 264/163, 157, 145, 23, 264/280, 281, 285; 24/205.11

[56] References Cited
UNITED STATES PATENTS

| | | | |
|---|---|---|---|
| 2,577,584 | 12/1951 | Hofreiter | 264/157 |
| 3,340,594 | 9/1967 | Frohlich | 24/205.11 F |
| 3,608,034 | 9/1971 | Bramley | 264/145 |
| 3,672,008 | 6/1972 | Moertel | 24/205.11 F |
| 3,686,719 | 8/1972 | Johnstone | 24/205.11 F |
| 3,813,459 | 5/1974 | Potin | 264/163 X |

Primary Examiner—Richard R. Kucia
Attorney, Agent, or Firm—Bucknam and Archer

[57] ABSTRACT

A method of producing a ladder-like structure for use as a row of interlocking elements for a slide fastener is disclosed. A pair or pairs of elongated connecting members are advanced in parallel alignment along their length at predetermined intervals. For the pair or pairs of connecting members, a plurality of element-forming spaced strips of a thermoplastic material are fed simultaneously for attachment transversely to the connecting members. The result is to produce a ladder-like structure at increased rate of speed which is suitable for use as a row of fastener elements.

3 Claims, 6 Drawing Figures

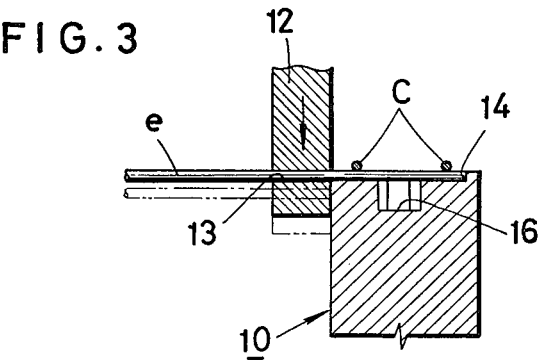
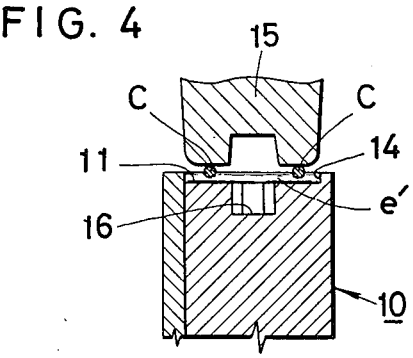
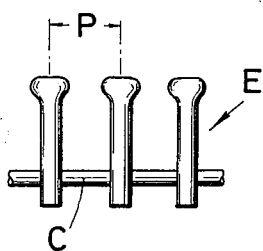 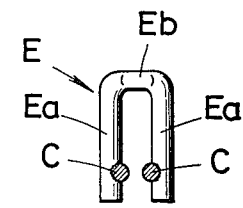

METHOD OF PRODUCING INTERLOCKING ELEMENTS FOR SLIDE FASTENERS

BACKGROUND OF THE INVENTION

This invention relates to a method of producing rows of interlocking elements for slide fasteners. More particularly, the invention is directed to the provision of a row of fastener elements formed from a plastics filament into a multiplicity of discrete interlocking members which are aligned in spaced relationship transversely across and bonded to a plurality of connecting members extending in parallel relationship along a continuous length, the resultant interlocking members being folded along the longitudinal center line of the connecting members into a U-shaped configuration as viewed in end elevation.

There have been heretofore proposed rows of slide fastener elements of the character described, but most of them have relied upon the formation of such elements by extrusion in which a strip of thermoplastic material is extruded piece by piece into a desired shape and bonded with heat to a plurality of parallel connecting members that are fed unidirectionally. Such methods have the drawback that they are rather time-consuming due to limited speeds for extrusion of individual elements and subsequent cooling thereof and hence, the rate of production is considerably retarded.

SUMMARY OF THE INVENTION

With the above-noted drawback of the prior art in view, it is an object of the invention to provide an improved method of producing rows of interlocking elements for slide fastener which will render it possible to feed and connect a plurality of element-forming strips simultaneously in proper alignment to parallel connecting members thereby increasing the rate of production manifold. This object is achieved, briefly stated, by the steps of aligning a plurality of element-forming strips in spaced relationship, the strips being spaced equally apart by a distance corresponding to a pitch of adjacent elements in their final form, feeding the thus aligned strips simultaneously transversely across a plurality of connecting members extending in parallel along a continuous length and moving unidirectionally intermittently, and severing the strips to a predetermined length either before or after they are fed to the connecting members. The strips are subsequently bonded to the connecting members as by means of a supersonic horn and finished to a desired shape in a manner well known in the art.

The features which are believed to be novel and characteristic of the invention are pointed out with particularity in the appended claims and will appear more clear from the following detailed description taken in conjunction with the accompanying drawings which illustrate a preferred embodiment of the invention.

BRIEF DESCRIPTION OF THE ACCOMPANYING DRAWINGS

FIG. 3 is a sectional view taken along the line III-III of FIG. 1;

FIG. 4 is a sectional view taken along the line IV-IV of FIG. 1;

FIG. 5 is a plan view of a row of fastener elements produced in accordance with the invention; and FIG. 6 is a side elevation of the same.

DETAILED DESCRIPTION OF THE PREFERRED EMBODIMENT

Figure 1:
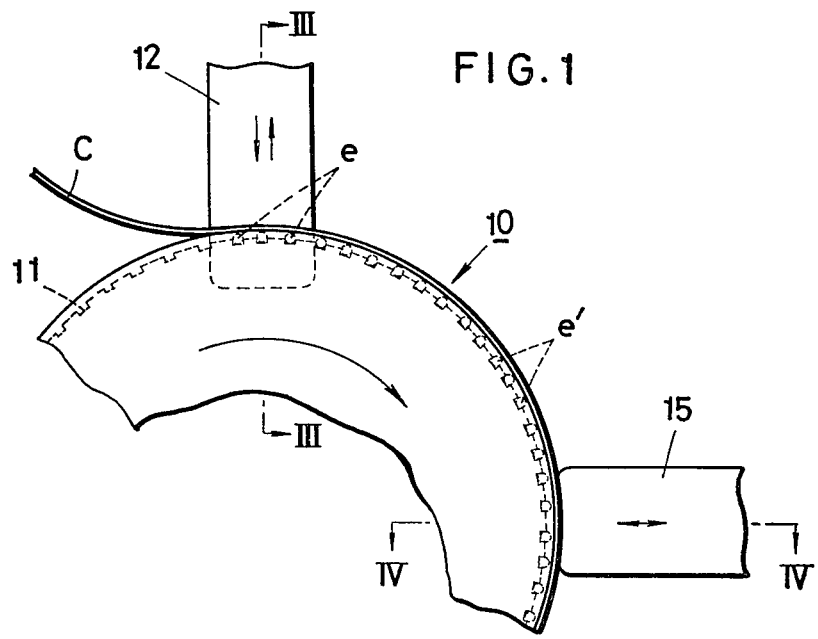
FIG. 1 is a front elevation diagrammatically illustrating a form of apparatus employed for carrying the method of the invention into practice.

Referring now to the drawings and firstly to FIGS. 5 and 6, there is shown a row of interlocking fastener elements E which are uniformly spaced a predetermined pitch P apart and each bent into a U-shaped configuration with two legs $Ea$ branching off from the coupling head $Eb$, the elements E being interconnected along their arms $Ea$ by a pair of elongated connecting members C extending in parallel alignment and located confronting each other remote from the coupling heads $Eb$. This type of element row is produced by the method of this invention which follows.

Figure 2:
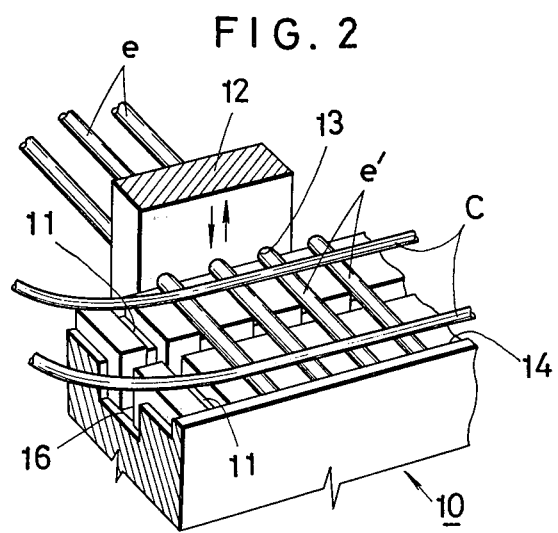
FIG. 2 is a perspective view of part of the apparatus of FIG. 1.

In the presently illustrated embodiment, a pair of connecting members C in the form of a textile or plastic thread are supplied in parallel alignment along the periphery of a die wheel 10 and advanced intermittently with rotation of the latter in the direction of the arrow as shown in FIG. 1. A plurality of element-forming strips $e$ preferably in the form of a thermoplastic filament are aligned parallel to one another and fed simultaneously transversely across and substantially at right angles to the pair of connecting members C as better seen in FIG. 2. When thus feeding the strips $e$, these are spaced equally apart by a distance corresponding to an element-to-element pitch P required for engagement with those elements E on the mating stringer. To hold the strips $e$ in the properly spaced relation and accurately at right angles to the parallel connectors C, the strips $e$ are arranged to be seated in the grooves 11 formed in the peripheral surface of the die wheel 10 and extending axially thereof. The apparatus employed to carry the method of the invention into practice also includes a cutter 12 as shown in FIGS. 1 to 3, which is disposed for vertical movement closely along one side of the die wheel 10 to sever the strips $e$ to a desired length. The cutter 12 has a plurality of apertures 13 arranged to register with the grooves 11 of the die wheel 10 when the strips $e$ are fed as shown in FIG. 3. In this position of the cutter 12, the strips $e$ are passed through the apertures 13 into the grooves 11 and under the connectors C until the leading end of each strip abuts against the end wall 14 of the groove 11. The strips $e$ are then severed as the cutter 12 descends as shown in FIGS. 1 and 2. This is followed by the rotation of the die wheel 11 to advance the connectors C together with the severed strips $e'$ for a distance corresponding to the number of pitches P of the strips $e$ that have been fed, which is three according to the illustrated embodiment. In this position, the die wheel 11 is arranged to stop for receiving an ensuing group of strips $e$. The strips $e$ are thus fed successively in the manner described, as the die wheel 10 comes to a stop for each interval. The attachment of the strips $e'$ to the connectors C is effected by for example a supersonic horn 15 which is movable toward and away from the periphery of the die wheel 10 and which causes the connectors C to bond with the strips $e'$ as shown in FIGS. 1 and 4. The resulting row of element-forming strips $e$ which appears in the form of a ladder-like structure will be subjected to further processing whereby the row of strips is bent along its longitudinal center line to become U-shaped in end elevation and is also provided with the coupling heads E*b* as seen in FIGS. 5 and 6. Such processing is well-known and may be carried out by a bending roll (not shown) which is engageable in the circumferential slot 16 of the die wheel 10 to fold the strips *e* to provide branched legs E*a*, and a punch (not shown) for flattening out the bight of the bent strips to provide coupling heads E*a*.

Having thus described the invention with regard to a preferred embodiment, it will be understood that various modification or changes may be made therein without departing from the scope of the appended claims. As for an example, many pairs of parallel connecting members C may be used and the number of element-forming strips *e* therefor may be increased so as to achieve a maximum rate of production. As for another example, the starting strips *e* may be cut to a desired length in advance to the feeding thereof to the die wheel 10 and such pre-cut pieces of strips *e* may be delivered by means for example of a gravity chute.

What is claimed is:

1. A method of manufacturing a series of discrete U-shaped fastener elements interconnected in a row, which method comprises intermittently advancing a plurality of elongated connecting members lengthwise and in mutually parallel relationship, holding a plurality of strip members spaced apart from one another by a distance corresponding to a selected pitch between adjacent fastener elements, feeding said strip members transversely across said connecting members for contact therewith at respective intersections, cutting said strip members to a given length, bonding said connecting members and strip members to each other at said intersections, and bending said strip members at portions thereof intermediate said connecting members to form each of said strip members into a U-shape to define a respective fastener element.

2. The method as defined in claim 1 which includes passing said strips under and at right angles to said connecting members.

3. The method as defined in claim 1 which includes severing said strips to a desired length prior to feeding to said connecting member.

* * * * *